United States Patent [19]
Sloan

[11] Patent Number: 5,883,743
[45] Date of Patent: Mar. 16, 1999

[54] VANDER-LUGT CORRELATOR CONVERTING TO JOINT-TRANSFORM CORRELATOR

[75] Inventor: Jeffrey A. Sloan, Costa Mesa, Calif.

[73] Assignee: Corning OCA Corporation, Marlborough, Mass.

[21] Appl. No.: 594,180

[22] Filed: Jan. 31, 1996

[51] Int. Cl.$^6$ .............. G02B 27/46; G03H 1/16; G06K 15/316; G06K 9/36
[52] U.S. Cl. .............. 359/561; 359/29; 359/559; 359/560; 382/278; 382/280
[58] Field of Search .............. 359/29, 560, 561, 359/559, 100; 382/210, 278, 280

[56] References Cited

U.S. PATENT DOCUMENTS

| | | |
|---|---|---|
| 4,277,137 | 7/1981 | Upatnieks et al. .............. 359/560 |
| 4,588,260 | 5/1986 | Horner . |
| 4,715,683 | 12/1987 | Gregory et al. . |
| 5,073,006 | 12/1991 | Horner et al. . |
| 5,101,270 | 3/1992 | Boone et al. . |
| 5,148,496 | 9/1992 | Anderson . |
| 5,150,228 | 9/1992 | Liu et al. . |
| 5,220,622 | 6/1993 | Scarr .............. 359/29 |
| 5,282,067 | 1/1994 | Liu . |
| 5,418,380 | 5/1995 | Simon et al. . |
| 5,659,637 | 8/1997 | Bagley et al. .............. 382/278 |

OTHER PUBLICATIONS

Knopp "Optical calculation of correlation filters" SPIE vol. 1295 1990 pp. 68–75.
Barnes et al "Optoelectronic determination of binary phaseonly filters for optical correlation" Optical Engineering 1992 pp. 1936–1945.
Ross, Miniature Ruggedized Optical Correlator Optimized for Space LEOS 1991 pp. 1–18.

Primary Examiner—Cassandra C. Spyrou
Assistant Examiner—Audrey Chang
Attorney, Agent, or Firm—Edward F. Murphy, Esq.

[57] ABSTRACT

A module, capable of being mounted on a printed circuit board, containing optical components necessary for optical correlation and a unique folded light path technique for conversion from a Vander Lugt optical correlator to a joint-transform optical correlator, or visa versa, with no electronic changes required. The folded optical path permits a polarizing filter to be positioned in the beam path reflected by a filter SLM but before a correlation detector means when the correlator is in a Vander Lugt mode and permits the polarizing filter to be removed, and an auxilliary mirror or other optical components positioned in the beam path to eliminate the filter SLM and to direct the beam path toward the correlation detector means when the optical correlator is to become a two-cycle joint-transform optical correlator and simultaneously match the Fourier transform plane to the detector plane of the detector means. The polarizing filter is mounted on the module cover for ease of placement and for ease of removal, while the mirror or other optical components are mounted on another module cover for ease of placement at the required precise point in the folded optical path and ease of removal. In lieu of changing covers, the mirror and other optical components as the case may be may be moved, as by sliding, pivoting or rotating, for the conversion of the Vander Lugt correlator to the joint-transform correlator and visa versa.

13 Claims, 16 Drawing Sheets

FIG. 8
FIG. 9
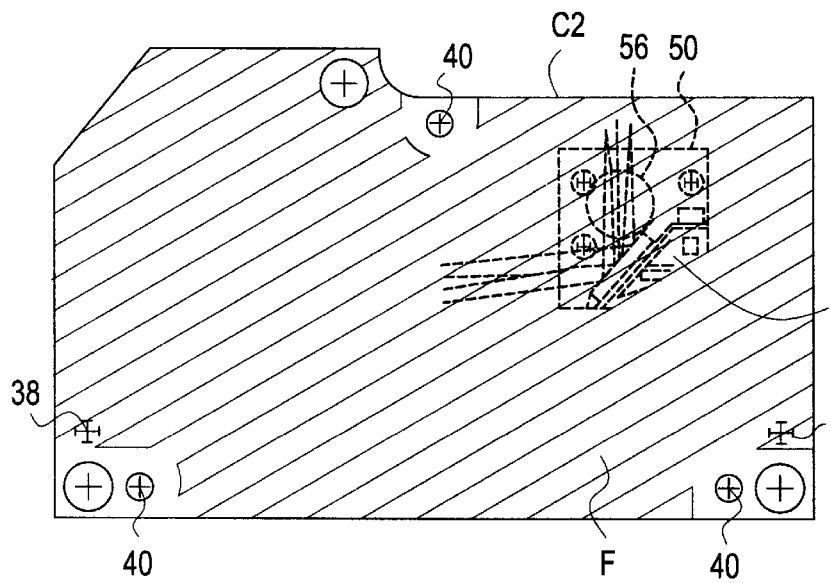
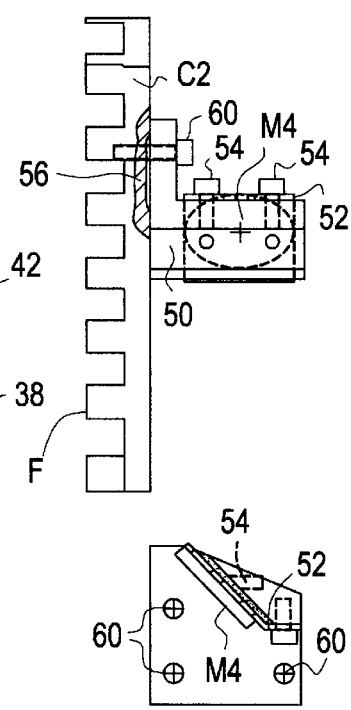
FIG. 10
FIG. 11
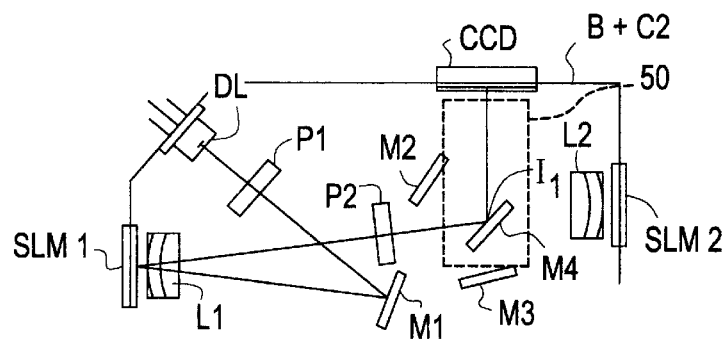

VANDER-LUGT CORRELATOR CONVERTING TO JOINT-TRANSFORM CORRELATOR

The U.S.Government has a paid-up license in this invention and the right in limited circumstances to require the patent owner to license others on reasonable terms as provided for by the terms of contract No. DAAH01-94-C-R253 awarded by U.S. Army Missile Command.

RELATED APPLICATIONS

1) Application entitled VANDER LUGT OPTICAL CORRELATORS FOR PERSONAL COMPUTERS by Harold R. Bagley, Jr., Jeffrey A. Sloan and Donald W. Small Ser. No. 08/249,820, filed May 26, 1994, now abandoned and refiled as Ser. No. 08/667,275, now U.S. Pat. No. 5,659,637 which is incorporated herein by reference, and 2) Application entitled JOINT TRANSFORM OPTICAL CORRELATORS FOR PERSONAL COMPUTERS by Jeffrey A. Sloan Ser. No. 08/490,871, filed Jun. 15, 1995, now abandoned which is incorporated herein by reference.

BACKGROUND OF THE INVENTION

This invention relates, in general, to optical processing and to improvements in Vander Lugt and joint-transform optical correlators.

This invention improves optical correlators in two ways. The first improvement is the capability of converting a module containing all optical components necessary for optical correlation as a Vander Lugt correlator to a joint-transform correlator, and visa-versa, by the placement or exchange of only one to three simple optical components without disturbing the other components or their alignment and without changing in the electronics involved. The second improvement is the miniaturization of such optical correlators containing this first improvement to provide the users of personal computers (PCs) with Vander Lugt and joint-transform optical processing capabilities.

It will be apparent to those skilled in the art after a study of the drawings and the written description herein that the first improvement may be incorporated in any optical correlator module of any size. However for simplicity, the invention will be described as part of the miniaturization of such optical correlators.

Miniaturized optical correlators are capable of being mounted on plug-in printed circuit boards, or other mounting means, or desk-top PCs, or capable of being mounted on printed circuit boards, or on other mounting means, for optional external equipment connected to the ports of desk-top or laptop PCs. Redesigning the computer interface would allow this invention to operate off of other larger computer architectures, such as VME platforms.

In the first related application, paragraph 1) above, there is disclosed and claimed a miniaturized Vander Lugt optical correlator in a module with a folded optical path technique, along with other optical components to provide optical correlation, adapted to be mounted on a standard personal computer printed circuit board, containing all support electronics. This Vander Lugt optical correlator is capable of being plugged inside a PC or on other mounting means to be used with or in a PC. So far as it is known, this Vander Lugt correlator is the first miniaturization of an optical correlator suitable for such purpose.

In the other related invention, paragraph 2) above, there is disclosed and claimed a one or two-stage miniaturized joint-transform optical correlator in a module with a folded optical path technique, along with other optical components to provide optical correlation, adapted to be mounted on a standard personal computer printed circuit board, containing all support electronics. This joint-transform optical correlator is capable of being plugged directly into a PC or on other mounting means usable with a PC.

In many applications for optical correlators, the user has a priori knowledge of the target image to be identified and uses a Vander Lugt correlator with filters containing a suitably processed reference image (often called a "filter") for comparison to the target image. The Vander Lugt correlator is useful where a finite number of reference filters are required for comparison with the target image, but in the case where too many filters are needed or new situations arise, (ie, little a priori knowledge exists), a joint-transform correlator is preferred because it is more flexible. By saving an image of the new object (or situation), and isolating the portion of interest, this type of correlator can be immediately configured for the new application.

This invention, in addition to miniaturizing an optical correlator, enables the user to convert a Vander Lugt optical correlator to a joint-transform optical correlator, or visa versa, with no electronic changes required. Stated another way, the user has the option of operating this invention as a Vander Lugt optical correlator or as a joint-transform optical correlator by the simple replacement or exchange of one to three optical components without disturbing the other optical components or their alignment.

SUMMARY OF THE INVENTION

It is therefore an object of this invention to provide a module containing all optical components necessary for optical correlation for conversion from a Vander Lugt optical correlator to a joint-transform optical correlator, or visa-versa.

It is still another object of this invention to provide a module containing optical components necessary for optical correlation, capable of being mounted on a printed circuit board, with no electronic changes required when converted from a Vander Lugt optical correlator to a joint-transform optical correlator, or visa versa.

The module which accomplishes the foregoing object comprises a unique folded optical path along with the necessary optical components for optical correlation. Depending on the actual devices used to implement the functions of inputting data (scene SLM), processing data (filter SLM), and detecting the resultant data (CCD for example), the actual optical layout (folds, path lengths, module's size) may vary. For example, if reflective SLMs are used, the light paths will be directed from one optical component to the next differently than if transmissive SLMs (or a combination of both) are used. In any case, the optical properties, and conversion from one architecture to the other, are equivalently feasible.

When the optical correlator is in a Vander Lugt correlation mode and only reflective SLMs are used, a polarizing filter is positioned in the optical path reflected by the filter SLM but before the correlation plane detector, in this embodiment, a CCD. When the optical correlator is to become a joint-transform optical correlator, the polarizing filter is removed and an auxiliary mirror is positioned in the optical path at a precise point before the filter SLM and before the correlation CCD to short cut the filter SLM and to direct the optical path directly towards the CCD.

There are many ways in which the polarizing filter is removed and the auxiliary mirror is positioned in the optical path.

One way in which the polarizing filter is removed and the auxiliary mirror is positioned in the optical path is by moving, as by pivoting or sliding, the polarizing filter out of the optical path and moving, as by pivoting or sliding, the auxiliary mirror into the optical path. In this way, only one cover is used.

In another way, the polarizing filter is mounted on one module cover for ease of placement at a point in the folded optical path between the filter SLM and the CCD and for ease of removal, while the mirror is mounted on another module cover for ease of placement at its precise point in the folded optical path and for ease of removal.

In other embodiments of this invention, where transmissive or a combination of transmissive and reflective SLMs are used, an auxiliary mirror, or a polarizing beam splitter, plus a focusing lens are positioned in the optical path at a precise point before the filter SLM and before the correlation CCD to short cut the scene SLM and to direct the optical path toward the filter SLM and correlation CCD.

Again, in these embodiments like the previous embodiment, there are many ways of removing the optical components and positioning other optical components to convert the Vander Lugt correlator into a joint transform correlator.

In one way is to move the optical components used in the Vander Lugt configuration out of the optical path, as by sliding or pivoting, and to move the other components, as by pivoting or sliding, into the folded light path to form a joint-transform configuration.

In another way, these optical components are mounted on replaceable covers for ease of placement at their precise point in the folded light path and for ease of removal.

Because the scene and filter SLMs function in an identical manner, ie, displaying an image, it is possible to use the filter SLM to display input scene imagery in the joint-transform mode.

BRIEF DESCRIPTION OF THE DRAWINGS

FIG. 8 is a plan view of the cover and auxilliary mirror when the module operates as a joint-transform optical correlator, FIG. 9 is a side view of the cover showing the mount for the auxiliary mirror, FIG. 10 is a plan view of the mount of the auxilliary mirror, FIG. 11 is a simplified illustration of the correlator to clearly show the optical components of light path of FIGS. 6 and 7.

BRIEF DESCRIPTION OF THE PREFERRED EMBODIMENTS

Figure 1:
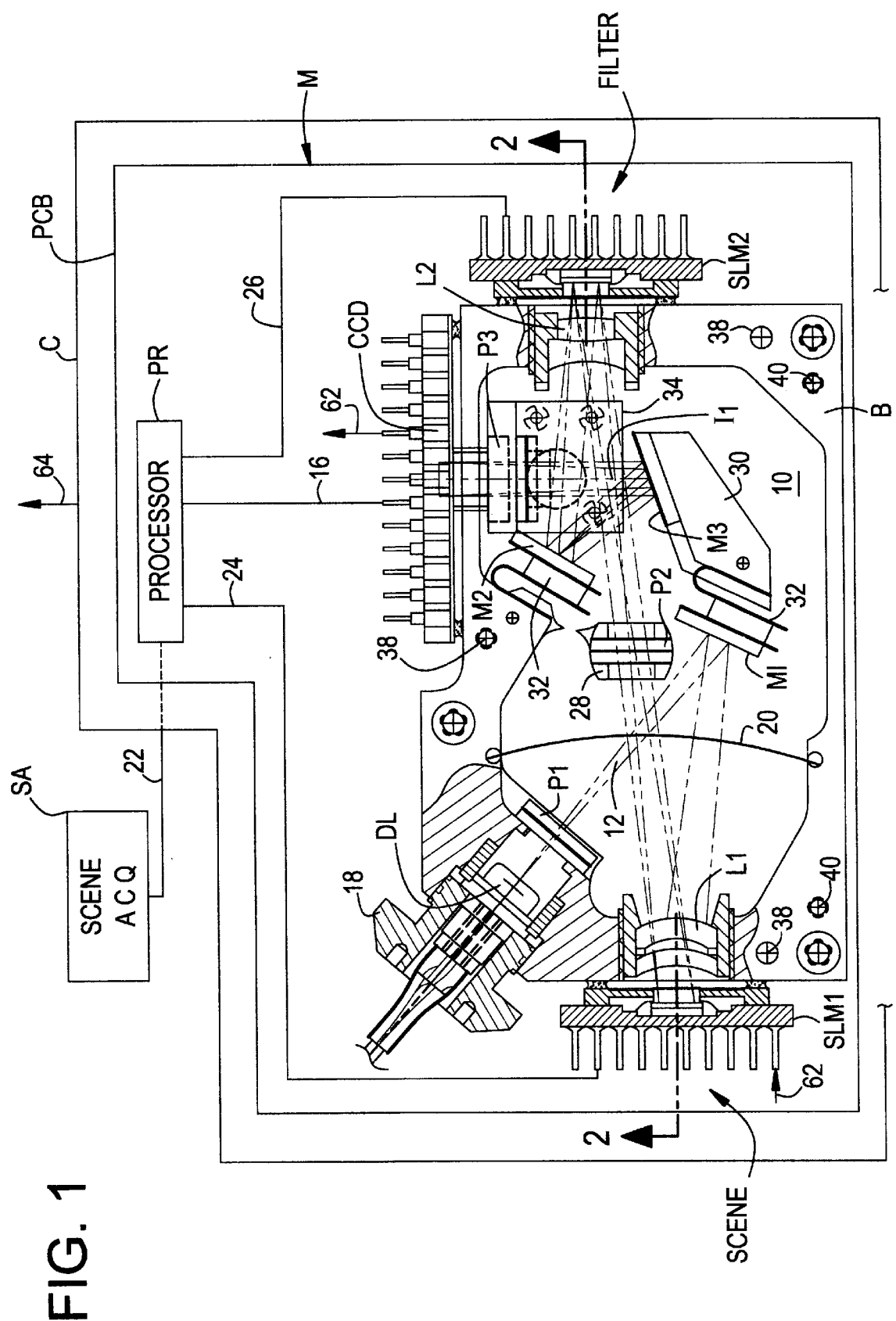
FIG. 1 is a plan view of the base of the module of this invention, without a module cover, showing the polarizing filter in the folded optical path before the correlation CCD for the Vander Lugt optical correlator version.
Figure 2:
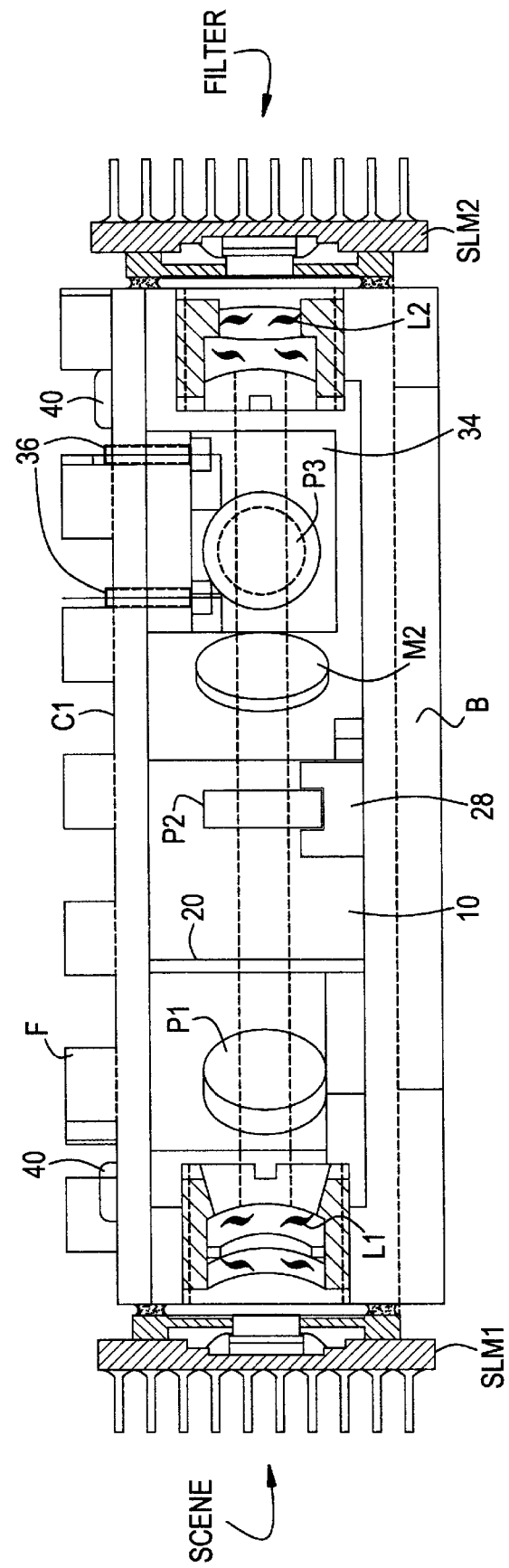
FIG. 2 is a cross-sectional view, taken along line 2—2 of FIG. 1, to show the polarizing filter mounted on the module cover (this line 2—2 is stepped between the lower SLM to the higher SLM, as shown in the drawings, to clearly show the polarizing filter and its mount)
Figure 3:
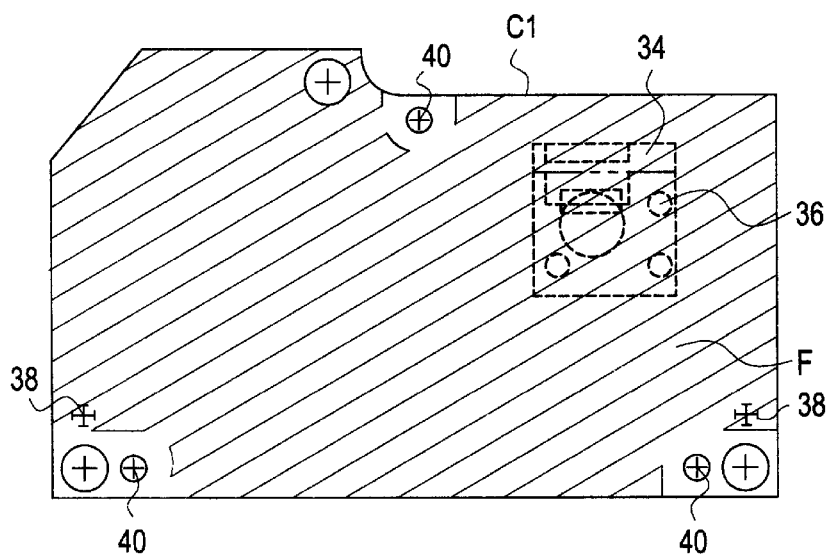
FIG. 3 is a plan view of the cover and polarizing filter when the module operates as a Vander Lugt optical correlator.
Figure 4:
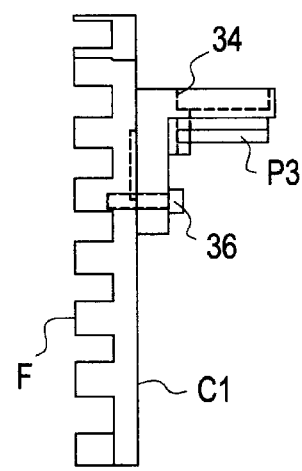
FIG. 4 is a side view of the cover showing the mount for the polarizing filter.
Figure 5:
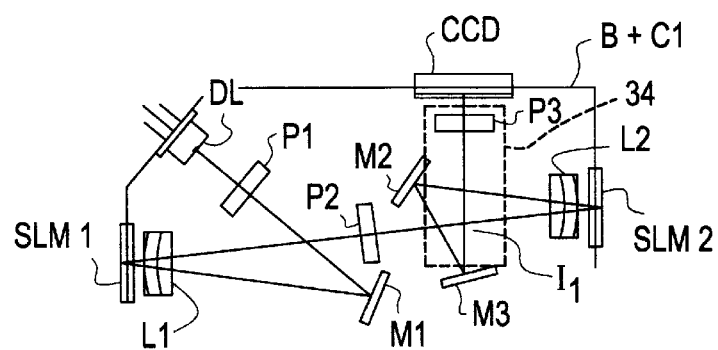
FIG. 5 is a simplified illustration to clearly show the optical components and light path of FIGS. 1 and 2.

FIGS. 1–4 show module M as the Vander Lugt version of the optical correlator of this invention positioned on a printed circuit board PCB, shown only partially. FIG. 1 shows base B with the cover removed to show the folded optical path within a light proof internal cavity or enclosure 10. FIG. 2 shows cover C1 and base B as defining this cavity 10. FIGS. 3 and 4 show the cover C1 with the optical component used in the Vander Lugt version of the correlator and FIG. 5 is a simplified illustration of the optical components and light path of FIGS. 1 and 2 and showing particularly the intersection I1.

Figure 6:
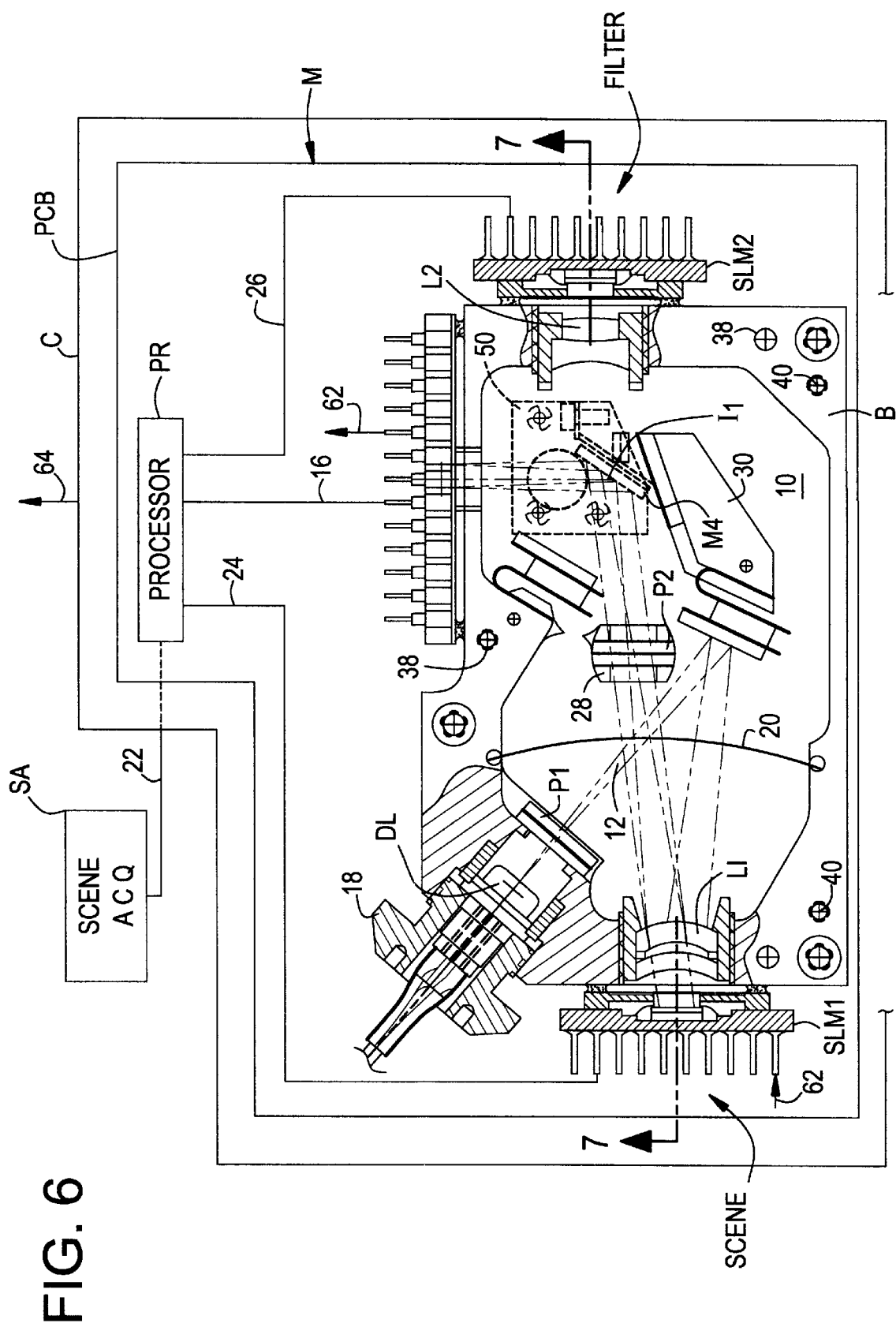
FIG. 6 is a view of the base of the module as in FIG. 1 but with a mirror inserted in the optical path to transform the Vander Lugt optical correlator into a joint-transform correlator.
Figure 7:
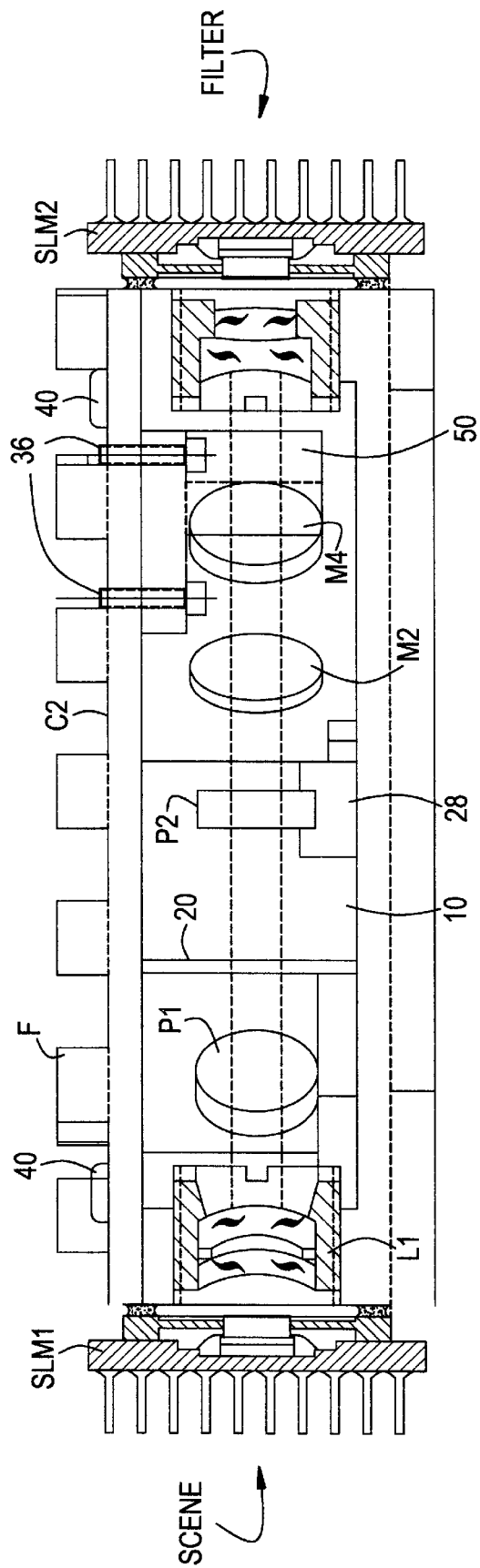
FIG. 7 is a cross-sectional view, taken along line 7—7 of FIG. 6, showing the mirror mounted on the module cover (this line 7—7, like line 2—2 of FIG. 2, is stepped between the lower SLM and the higher SLM, as shown in the drawings, to clearly show the auxilliary mirror and its mount)

FIGS. 6–10 show module M as the joint-transform version of the optical correlator of this invention. FIG. 7 shows the module with cover C2, which is identical to cover C1, except for the optical component and mount used in the joint-transform version of the optical correlator. FIGS. 8–10 show the cover C2 and different views of the optical components for the joint-transform correlator. FIG. 11 is a simplified illustration of the optical components and light path of FIGS. 6 and 7 and showing particularly the intersection I1.

In both versions of the optical correlator shown in FIGS. 1 and 6, computer C is shown schematically as encompassing (including) the correlator within the computer.

As shown in FIG. 1, a diode laser DL, mounted in the base B, directs its beam 12 through a polarizing filter P1 toward a mirror M1, located at an angle to the beam 12, to fold this beam toward a lens L1 (in this embodiment, a doublet though any suitable optical "element"—singlet, doublet, triplet, etc, diffractive element, or even a high-resolution transmissive phase-modulating SLM could be used) which collimates and focuses the beam to illuminate an electronically addressable spatial light modulator, SLM1. In this embodiment, SLM1 is a reflective device. SLM1 is the scene SLM containing the target image to be correlated. SLM1 imprints its image on the beam by spatially modulating its polarization and/or phase and reflects the modulated beam back through the lens L1. The lens L1 performs a 2D Fourier transformation and focuses the transformed beam through a second polarizing filter P2 and through a second lens L2 to illuminate a second electronically addressable spatial light modulator SLM2, displaying a reference filter. Again, in this embodiment, a doublet is shown as lens L2, although any suitable optical "element"—singlet, doublet, triplet, etc, diffractive element, or even a high-resolution transmissive phase-modulating SLM could be used. Filter SLM2 contains the pre-processed (Fourier transformed) image to be correlated with the live-processed target image in the scene SLM1. SLM2 may be identical to SLM1 or not, with respect to its array size, pixel size, pixel format, type of modulation, means of modulation, reflective or transmissive character, or manufacturer. In any case, the live Fourier transform and displayed transform on SLM2 must be optically scaled to match for the process to work. The light is reflected back by SLM2, through the lens L2, where a second Fourier transformation occurs and focuses the twice transformed beam onto a second mirror M2 located at an angle to the reflected beam which folds the beam and directs it toward a third mirror M3 which again folds the beam and reflects it through a polarizing filter P3, through a hole in the base B, and onto the CCD array, located at the correlation plane. (This is the Fourier plane of lens L2). Correlation, if any, between the target image and the reference image will be imaged on CCD and this information will be transferred electronically via 16 to a processor, represented by block PR and then perhaps to other memory in computer C. Mirror M3 is required to restore the handedness of the beam because mirror M2 reverses the handedness of the correlation image.

In this embodiment, diode laser DL and its heat sink 18, lens L1 and lens L2 are located in three holes in the walls of the module's base B to access the internal cavity and a fourth hole is provided for the CCD to access this internal cavity.

SLM1, SLM2 and CCD are bonded to the outside wall of the base B after alignment and access the internal optical cavity through three of these four holes. Also, an optical baffle 20 is located between SLM1 and polarizer P3 to eliminate scattered light from SLM1 from reaching the CCD. The optical baffle comprises a suitable opaque material with holes of a selected size to allow only the desired amount of the beam to reach polarizer P3.

Computer C which also includes an operation software program to run the entire system and a filter generator software program (for the Vander Lugt version) to generate and manipulate filter images before they are used in the correlator. The operator program and any changes to the filter images generated by the filter generator program may be saved and stored in a RAM preferably located in computer C. The filter images to be used when correlating are stored in a RAM on the PC board itself. See FIG. 12.

FIG. 1 also shows an input scene acquisition sensor, represented by block SA. The scene from scene acquisition sensor SA, shown coupled via 22 to the processor PR, is fed into the processor PR whose output is coupled at 24 to feed the input image to SLM1. The acquisition sensor is generally outside the computer, and may be a remote camera recording live video imagery, or a video tape or any other source of imagery containing objects to be recognized, such as a product, a vehicle, or objects on a TV screen, or any data in a two-dimensional format to be presented to the correlator. It may also be pictorial data (2D) that is stored in the computer's memory. The acquisition sensor SA begins the transferance of this real scene to an input image for the correlator at SLM1. If an external video system is used, the video signal may be digitally edited by the computer or video card, or processor PR, to show only a portion of the target image, (as limited by the array size of SLM1), as well as to modify the input image's contrast and brightness.

The filter SLM2 is shown connected at 26 to processor PR to receive the stored filter images for display.

The diode laser DL provides a polarized coherent point source of light, and the linear polarization of the beam is further refined by polarizer P1, aligned for maximum transmission. This improves the polarization's linearity from approximately 100:1 to approximately 1000 to 10,000:1. The direction of this polarization matches that required by SLM1.

The diode laser DL operates in either a continuous mode or a pulsed mode. When operating in the continuous mode, the detector CCD is shuttered to integrate the twice Fourier transformed beam when all of the displays on the SLMs have been updated at which time the detector CCD integrates the light pulses. When operating in the pulse mode, the diode laser DL is pulsed when all of the displays on the SLMs have been updated at which time the detector CCD integrates the light pulses.

As an amplitude modulator, SLM1 imprints the imagery it displays on the laser beam collimated by lens L1 by locally altering its polarization vector. Polarizer P2 is used to transmit only the polarized light from the "active" areas of SLM1, and block the light from the "inactive" areas, hence isolate its Fourier transform, since the light from the "inactive" areas would fog the CCD with "noise". By "active" refers to the pixels of the SLM that change state to make the images appear (amplitude changes). If SLM1 operates as a phase modulator, the orientation of polarizer P2 would be changed to yield "+" and "−" values of phase delay. (The electronic operation of SLM1 does not change.) In this embodiment, polarizer P2 is located on an island mount 28 in the base B in the optical path between lens L1 and lens L2, and mirrors M1 and M3 are located on an island mount 30 in the base. Mirror M2 is located on the base itself and mirrors M1 and M2 are each provided with adjusting means comprising tip-tilt flexures, i.e., crossed pairs of U-shaped springs 32 adjustable by screws (not shown), to adjust their angle for optimal alignment. If manufacturing processes are sufficiently refined, these angular adjustments will not be necessary and these adjustments can be omitted.

As shown in FIGS. 2–4, the polarizing filter P3 is located on a mount 34 suitably attached to the cover C1 so that the removal of the cover will also remove this polarizing filter without disturbing the alignment of other optical components. Suitable means, such as screws 40, precisely locate the mount 34 on the cover C1 and two locating pins 38 and along with other screws 36 are also used to precisely locate the cover on the base.

The steps in the operation of this invention as a Vander Lugt correlator, while described above, are shown in attachment "A" hereto.

In this embodiment, the CCD is mounted 90° to the filter SLM2 and mirrors M2 and M3 fold the optical path uniquely in that the optical path from the scene SLM1 to the filter SLM2, and the optical path from mirror M3 to the CCD, intersect at point $I_1$ so that the optical paths (segments S1 and S2) from this intersection to either the SLM2 or the CCD are optically equal. See FIGS. 1 and 4. Thus, along these two paths (L1 to $I_1$ to L2 to SLM2, or L1 to $I_1$ to CCD) the Fourier transform is in focus at either image plane. This unique folding of the optical path provides easy conversion from a Vander Lugt correlator to a joint-transform optical correlator and visa versa.

Thus, to convert the Vander Lugt optical correlator to a joint-transform optical correlator, cover C1 is removed, the polarizing filter P3 is thereby removed, and an auxilliary mirror M4 is positioned in the optical path at point $I_1$ to intercept and redirect the beam to the correlation CCD. The polarizing filter P3 is removed because it would otherwise attenuate the transformed beam, not being oriented like polarizer P2.

In this embodiment, this auxilliary mirror is positioned on a mount 50 (similar to mount 34) and positioned on the cover C2, and again precisely located, and cover C2 is positioned precisely on the base by locating pins 38. An adjusting means located between mirror M4 and mount 50 in the form of a spring flexure 52 attached to mount 50 with adjusting screws 54 and a second adjustment means in the form of either a bellville washer or other spring means 56 with adjusting screws 60 located between the mount 50 and cover C2 permit accurate alignment of mirror M4. Should manufacturing processes become sufficiently refined, these tip-tilt angular adjustments will not be necessary and can be omitted.

Figure 24:
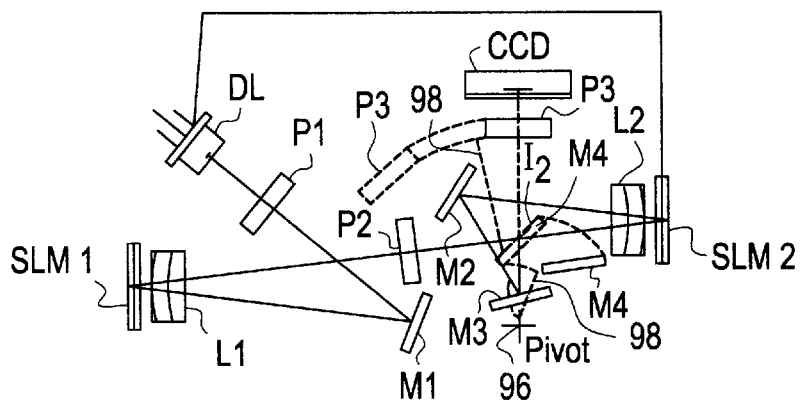
FIG. 24 is a simplified illustration, similar to FIGS. 5 and 11, showing the conversion from Vander Lugt configuration to a joint-transform configuration by simultaneously pivoting the polarizing filter out of the optical path and swinging in the auxiliary mirror into the optical path.

The conversion from a Vander Lugt configuration to a joint-transform configuration may be accomplished by moving, in this case pivoting, the polarizing filter P3 out of the optical path and by pivoting the auxilliary mirror M4 into the optical path to intercept and redirect the beam to the correlation CCD. This conversion of this embodiment of the invention is shown in FIG. 24 and will be described in more detail hereinafter.

FIG. 6 is a single stage joint-transform optical correlator, ie, the correlation process requires two passes through the same optics. In FIGS. 6 and 7, those components and optical paths which are the same as in FIGS. 1 and 2 have been given the same reference numeral. See also FIG. 11.

In this embodiment, SLM1 imprints its image (a side-by-side test scene and reference image) on the beam and reflects the beam back through lens L1 where a 2D Fourier transformation occurs as before. This transformed beam is directed through polarizer P2 and onto mirror M4 where it is reflected and focused onto the CCD. This "image" is a superimposing of the Fourier transforms of the two side-by-side images displayed on SLM1, the "joint-transforms".

The image captured by the CCD could be directly transferred back to the SLM1 via optional conductor 62. Normally, the CCD would send its image via conductor 16 to the processor PR which might be used to "enhance" the image (ie, improve the contrast of the joint-transform, specifically the fringe pattern) and the enhanced image is returned via conductor 24 to SLM1. Alternatively, this same electrical path can be used to transfer the image back to SLM1 with processor PR passive (equivalent to using conductor 62). The diode laser DL is pulsed again and this time lens L1 does a Fourier transform of the fringe pattern just detected by the CCD. This is the correlation between the two original images on SLM1. This correlation is focused by lens L1 onto the CCD and sent to the processor PR via conductor 16.

The image on SLM1 displays a reference image only, or a combined test and reference image simultaneously, epending upon whether the joint-transform process is initially started or in progress, ref. attachment "B" hereto. The combined images do not have to be equal in array area. The reference image generally contains what is to be identified; the test image being checked to see if the desired reference image is a subset.

If the Fourier transform of the combination of the two images have similarities, ie, a test image contains the correct view of what is to be correlated, the two Fourier transforms will "beat" due to their similarity and the nature of light and the coherence of the laser diode. This "beat" appears as a fringe pattern of low spatial frequency, ie, approximately 1–100 fringes across the CCD array. This represents the distance separating the two similar images on the SLM and the relative angle between them. If the test and reference images have nothing in common, there is no fringe pattern created at the Fourier transform plane; hence no correlation (which is as it should be if the images are totally dissimilar). This correlation or lack of it is transferred to computer C via conductor 64. See FIGS. 1 and 6.

Joint-transform correlation of the single stage embodiment of this invention are shown as process steps in attachment "B".

Dimensions:

SLM1=square package 1" on a side, or smaller (PGA10 carrier=1.00" sq)—Displaytech DR0256B, Active area=256×256 array of 15 μm square pixels (=3.84 mm square)

CCD=typical EG&G Reticon Corp chip is HSO256J (1.4"×0.75") or Dalsa chip is IA-D1-0256 (1.2"×0.6")

Active area (both cases)=256×256 array of 16 um square pixels (=4.096 mm square)

DL=Toshiba diode laser TOLD9215, λ670 nm, 10 mW, with power supply

Approximate physical beam path lengths:

For the Vander Lugt optical correlator

DL to SLM1=3.0"

SLM1 to SLM2=3.2"

SLM2 to CCD=2.6"

I1 to CCD=0.7"

For the joint-transform optical correlator
DL to SLM1=3.0"
SLM1 to M4 to CCD=3.2"
I1 to CCD=0.7"

The focal lengths for L1 and L2 are determined by the size of the pixels of the SLMs, the size of the pixel array (or active area) and the wave length of the light. The formula for determining the focal length, ie, between L1 and SLM2, is as follows:

$$L = \frac{P^2 \cdot N}{\lambda}$$

where L is the optical focal length of the lens assembly,

P is the spacing of the pixels in the SLM array, ie, pitch, and

N is the number of pixels along an edge of that array, and

λ is the wave length of the light from the laser diode.

The module's length must accomodate the focal length of L1, the physical lengths of L1 and L2, and both SLM packages. The length and width of the module is determined both by the focal lengths required by the optical components, the number of components and how the optical paths are folded. The module's thickness is mostly determined by the physical sizes of the CCD and SLM packages. The cross-sectional size of the optical path itself is essentially equal to the size of the largest array (or active area), or about 0.16" (3.84 mm) in this embodiment. It can be seen that with beam path lengths of approximately 3" and CCD of approximately 0.7"×1.4" and the SLMs of about 1" square, the size of the module may be approximately 3"×2"×1" (including heat sink 18 to accomodate diode laser DL) or very slightly larger. In fact, the module itself may serve as an additional heatsink, hence the fins on the outer surfaces. In this version of the module, the physical beam path lengths are not quite equal between DL and SLM1 and between SLM1 and SLM2 because the second path must also allow for the physical and optical presence of L2. The optical paths are, however, equal. However, the beam path lengths may also be unequal in other versions of the module due to the selection of SLMs and detectors with arrays (or light sensitive areas) of unequal sizes and unequal pixel sizes. This option is important for cutting production costs ("fewer pixels" in an SLM or CCD generally means the device is less expensive). Another case would be when the designer chooses to perform the Fourier transforms with an uncollimated system, in which case, the optical abberations so created must be compensated for in the filters or by other optics in the system. Nonetheless, it should be apparent that such a module size will fit easily on a printed circuit board for use inside a computer.

The material for the module M may be of any "suitable" metal, plastic, ceramic, or glass with the light tight cavity 10 being filled with air. "Suitable" refers to the mechanical and thermal stability with regard to the intended operating environment.

Figure 12:
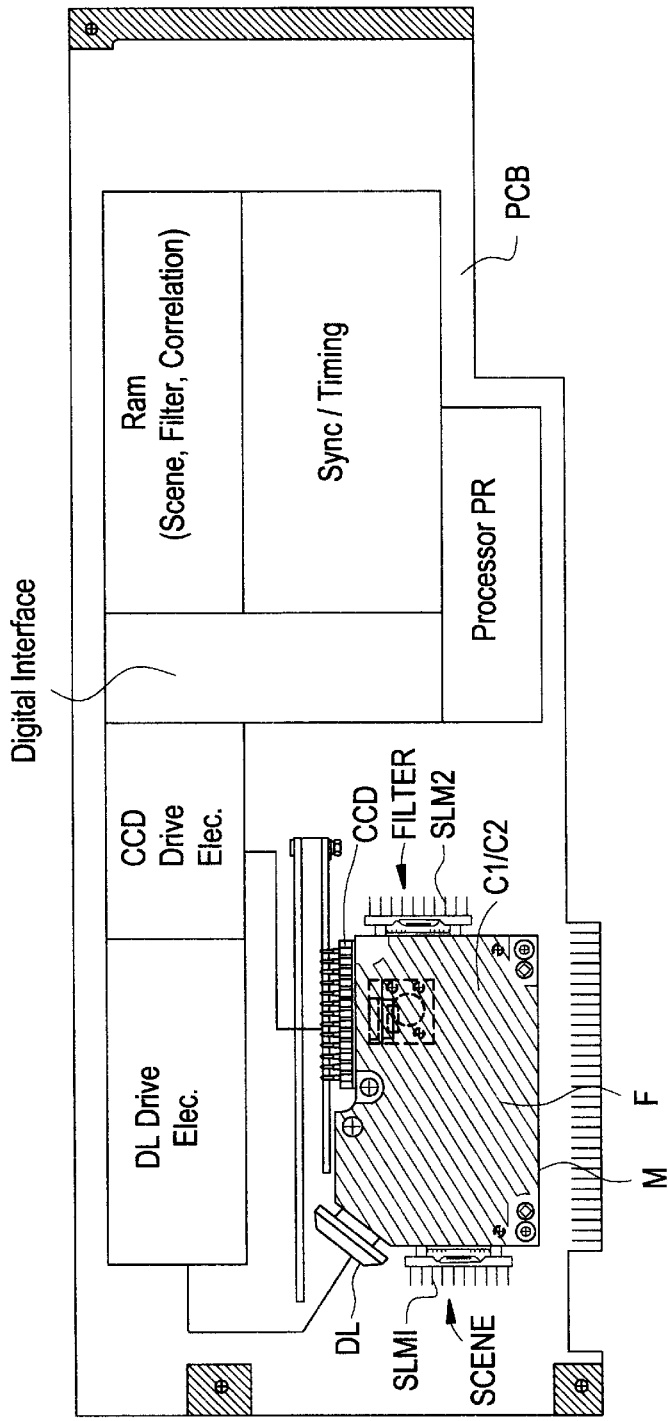
FIG. 12 is a schematic illustration of the module on a PC compatible printed circuit board.
Figure 13:
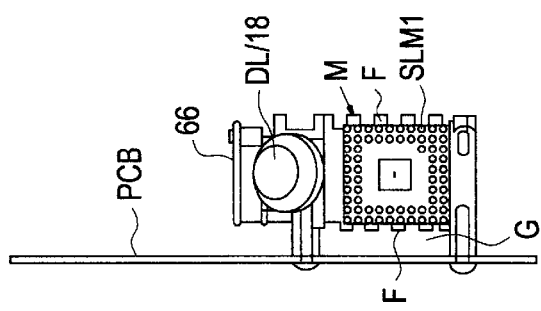
FIG. 13 is an end view of the module and the printed circuit board.

In FIGS. 12 and 13, there is shown a module M mounted on a standard size plug-in printed circuit board PCB with all of its support electronics. FIG. 13 also shows an end view of the module M with a bracket 66 for some of the electronics for the CCD.

The placement of the correlator module M on the printed circuit board will depend only on the normal constraints faced by a printed circuit board designer. What is important in this invention is that the module M is mountable on a printed circuit board and that all support electronics are on the printed circuit board. As an option, any or all of the support electronics may be located elsewhere leaving only the module M on the printed circuit board PCB to be connected to the PC by suitable cables. A space or gap G could be provided between the module M and the printed circuit board which would allow that area to be used for additional cooling, or for more support electronics as another possibility. Note fins F on covers C1 and C2 and base B are for passive cooling of the module.

In this depiction of the invention, module M is shown mounted between diode laser electronics and CCD drive electronics. All other electronics—Digital Interface electronics, Sync/Timing electronics, SLM and DL Driver electronics, Processor PR, Video RAM for the scene and filter, and correlation imagery, and peak detector RAM for correlation Peak Values, and their (X,Y) locations in the correlation imagery, are also located on the PC board. All necessary cables to interconnect the electronics are provided. The printed circuit board also contains conventional edge connector contacts to connect the printed circuit board and all its components to the electronics in the host PC.

Figure 14:
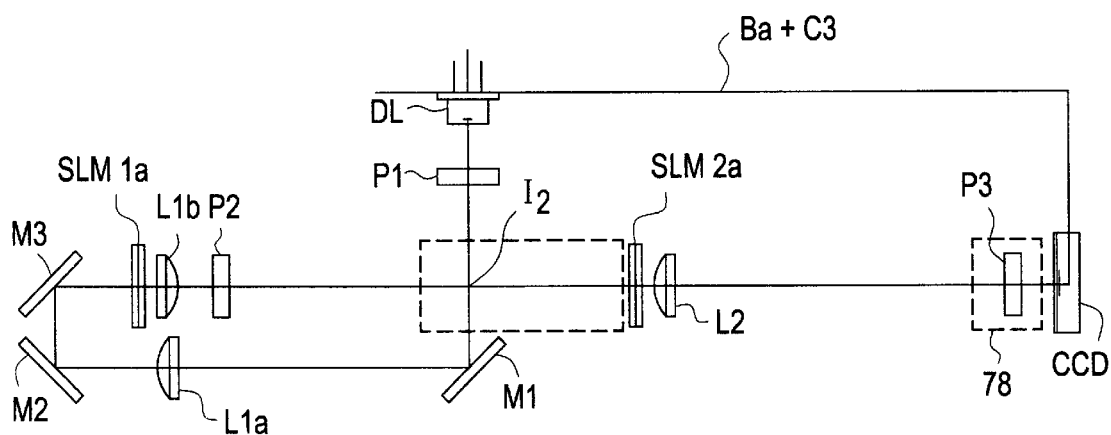
FIG. 14 is a simplified illustration of the Vander Lugt version of the correlator with transmissive scene and filter SLMs.
Figure 15:
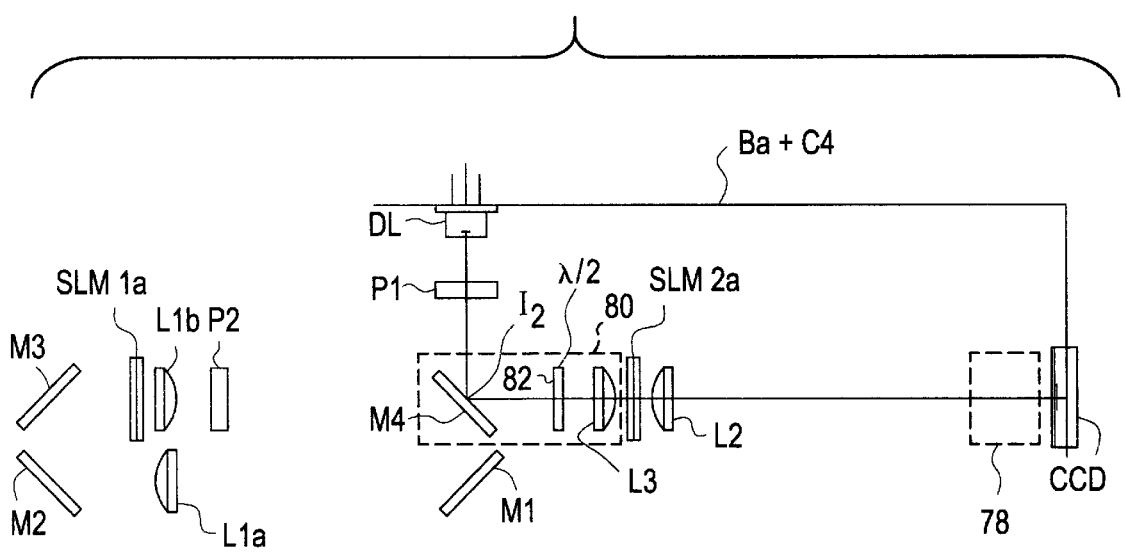
FIG. 15 is also of an illustration of the correlator, similar to FIG. 14, but showing the joint-transform version of the correlator with transmissive scene and filter SLMs.

Referring now to FIGS. 14 and 15, FIG. 14 illustrates the use of transmissive SLMs in a Vander Lugt type optical correlator and FIG. 15 illustrates the use of transmissive SLMs in a joint-transform optical correlator, both correlators being constructed in accordance with the teachings of this invention.

In both FIGS. 14 and 15, those components which function the same as in the prior correlators are given the same reference designations and those components which function similarly to those in the prior correlators are given the same reference designations but with an additional suffix "a".

Thus in FIG. 14, the beam from diode laser DL is directed through polarizer P1 onto mirror M1 which folds and redirects the beam through lens L1$a$ which collimates the beam. In this embodiment, lens L1$a$ is identical to lens L1. For packaging considerations, it could be made identical to lens 1$b$ or lens L2. Either way costs are reduced by duplicating parts. Similarly, lens L1$a$ could be a distinct optic, should such design or lay out criteria dictate. Mirror M2 directs the beam onto mirror M3 which in turn folds and reflects the beam through transmissive SLM1$a$. (SLM1$a$ is equivalent to SLM1 except that it is a transmissive device. The same applies to SLM2$a$ and SLM2.) The beam transmitted from SLM1$a$, now containing a scene image, is directed through lens L1$b$ which performs a Fourier transform thereon. (Lens L1$b$ functions equivalently as L1 in FIG. 5.) This transformed beam is directed through polarizer P2, as in the prior correlators, through the intersection point $I_2$ and onto the filter SLM2$a$, a transmissive SLM. Point $I_2$ is the point of intersection between the beam from polarizer P1 and the beam from polarizer P2. The beam transmitted from the filter SLM2 is directed through lens L2 which performs a second Fourier transform thereon and focuses this twice transformed beam through polarizer filter P3 onto the correlation CCD. Since this system has a transmissive filter SLM1, lens L2 can be designed to work on-axis. This is a simpler task than that shown in the earlier Figs. (off-axis applications) so lens L2 can be simpler as shown here.

In this version, cover C3 has a mount 78 holding P3 in the beam path. The cover is mounted on the base Ba with locating pins and screws in the same manner as in the prior correlators.

In FIG. 15, cover C3 (with filter P3) is replaced with cover C4 which includes a mount 80 for a mirror M4, a halfwave (λ/2) plate 82 and a lens L3. The wave plate 82 is required when the conversion from the Vander Lugt version to the joint-transform version uses the filter SLM as the input image device. It rotates the beam's polarization to establish the same optical orientations with respect to the filter SLM's optical parameters as was done by orienting the diode laser DL in the original Vander Lugt correlator of FIGS. 1–11. Mount 80 is similar to mount 50 in the prior correlators and is positioned on the cover C4 in the same manner. Removing cover C3, and replacing it with cover C4, converts the Vander Lugt correlator of FIG. 14 to a joint-transform correlator as shown in FIG. 15 in the same manner as the conversion from one correlator to another is accomplished in the prior correlators. Mirror M4 is located so that the beam from diode laser DL and polarizer P1 is reflected at point 12 and directed through lens L3 which collimates the beam for SLM2a. Again, a layout may be chosen to make lens L3 identical to one of the other optics to save costs. This latter SLM transmits the beam containing one or more images through lens L2 which performs a Fourier transform on this beam and directs this transformed beam onto the CCD at the correlation plane. The interruption of the beam at point $I_2$ eliminates the function of the other optical components. Thus, SLM2a becomes the input SLM to provide the two-cycle joint-transform function instead of the scene SLM as described in the prior joint-transform correlator version of FIGS. 6 and 11.

As pictured, the SLMs of FIGS. 14 and 15 are 256×256 arrays with 15 um pixels (square) and the CCD is a 256×256 array with 16 $\mu$m pixels (square). In this embodiment, the SLMs and the CCD have pixel dimensions on the order of 16 $\mu$m. If equivalent devices with pixel dimensions of up to 30 $\mu$m are used, the optical module, with its optics appropriately rescaled, can still be designed to fit on the PC board, PCB, and leave sufficient board space for the supporting electronics. Beyond 30 um, the pixels force optical dimensions to scale so large that these packaging requirements cannot be easily met.

All lenses are plano-convex of BK-7 material. The focal length of both lens L1a and L1b is 2.87" and the focal length of lens L2 and lens L3 is 1.40". The focal length of lens L1a is not critical, since it only collimates the input beam. Its selection depends on costs and the desire to keep it away from point $I_2$ so that it does not interfere with the joint-transform conversion. With these components, the overall length of the module Ma is approximately 6.3" although the length can be shortened by adding fold mirrors at various locations. The thickness of this module is the same as in the prior correlators and it is mounted on a printed circuit board as illustrated in FIGS. 12 and 13.

Figure 16:
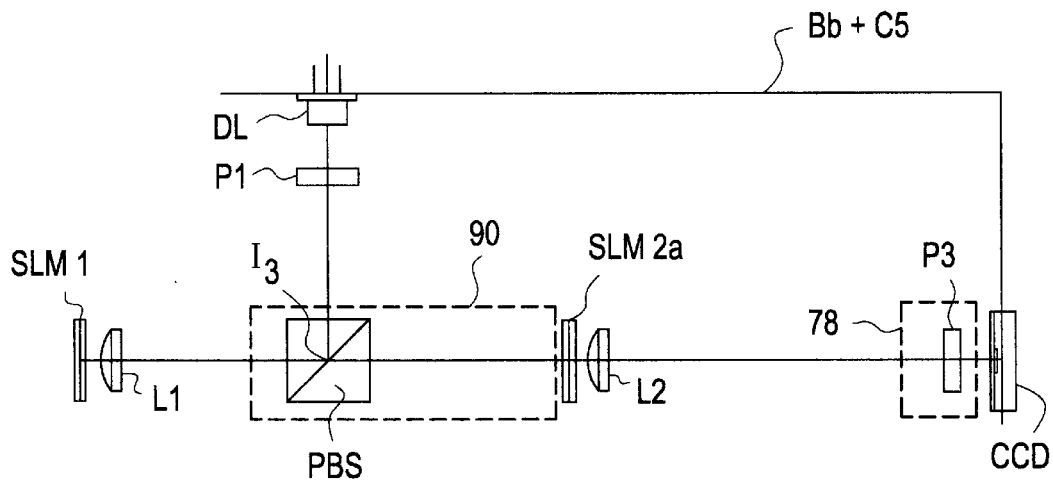
FIG. 16 is a simplified illustration of the Vander Lugt version of the correlator with reflective scene and transmissive filter SLMs.
Figure 17:
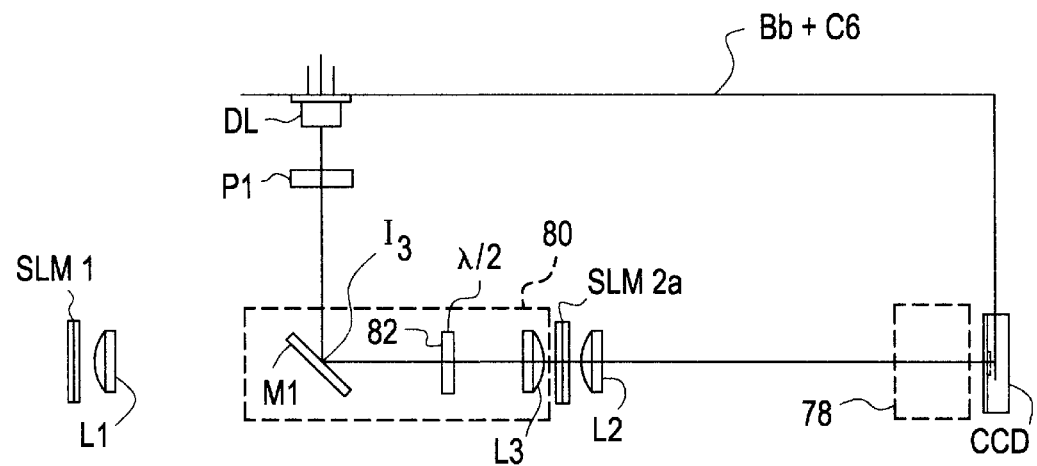
FIG. 17 is a simplified illustration, similar to FIG. 16, but showing the joint-transform version of the correlator with reflective scene and transmissive filter SLMs.

FIGS. 16 and 17 illustrate this invention with a reflective scene and transmissive filter SLMs. FIG. 16 illustrates a Vander Lugt type optical correlator and FIG. 17 illustrates a joint-transform optical correlator, both of which are constructed in accordance with the teachings of this invention.

As before, those components which function the same as in the prior correlators are given the same reference designations.

Thus, the beam from diode laser DL is directed through polarizer P1 and onto a polarizing beam splitter PBS which directs the beam through lens L1 which collimates the beam on SLM1 as in FIG. 5. (The beam splitter PBS functions similarly to mirror M1 in FIG. 14 and also includes a polarizing function thus eliminating the need for the polarizing filter P2 in this version). Being a reflective SLM, images on this SLM are directed back through lens L1 which now performs a Fourier transform on the reflected beam and directs this transformed beam through the polarizing beam splitter PBS and onto SLM2a. Intersection point I3 between the beam from lens L1 and the beam from polarizer P1 occurs within the PBS. SLM2a, being transmissive, upon receiving the transformed beam from lens L1 transmits the beam, now "filtered", through lens L2 which performs a Fourier transform on this beam. This twice Fourier transformed beam is then directed through polarizer P3 and onto the correlation CCD. Polarizer P3 is held on mount 78 as in FIG. 14.

In this version, cover C5 has a mount 90 for the PBS so that point $I_3$ is precisely located. Upon removal of the cover C5 which also removes the beam splitter PBS and polarizer P3, cover C6 is mounted on the base Bb. Cover C6 includes mount 80 with mirror M1, halfwave ($\lambda/2$) plate 82 and lens L3. Mirror M1 directs the beam from the diode laser DL through halfwave plate 82 to lens L3, which collimates it and illuminates filter SLM2a. As before, lens L3 may be chosen to be identical with lens L1 or lens L2 to save costs. Mount 80, halfwave plate 82 and lens L3 are the same as in FIG. 15. Covers C5 and C6 are positioned on base Bb in the same manner as the covers in the prior correlators.

Removing cover C5 and replacing it with cover C6 converts the Vander Lugt correlator of FIG. 16 into a joint-transform correlator as in FIG. 17 in a similar manner as the conversion from one correlator to another is accomplished in the prior correlators. In this case, however, the filter SLM2a now acts as a scene SLM.

The reflective SLM of FIGS. 16 and 17 is the same size as the SLM of FIGS. 1–15 and the transmissive SLM of these figures is the same size as the transmissive SLM of FIGS. 14 and 15. Thus, with all other components being of the same size as in the prior correlators, the overall length, width and height of this module is within the same size range as the prior modules and mountable on a PC board as in FIGS. 12 and 13. Again, additional fold mirrors may be used to reduce the module's "footprint".

Figure 18:
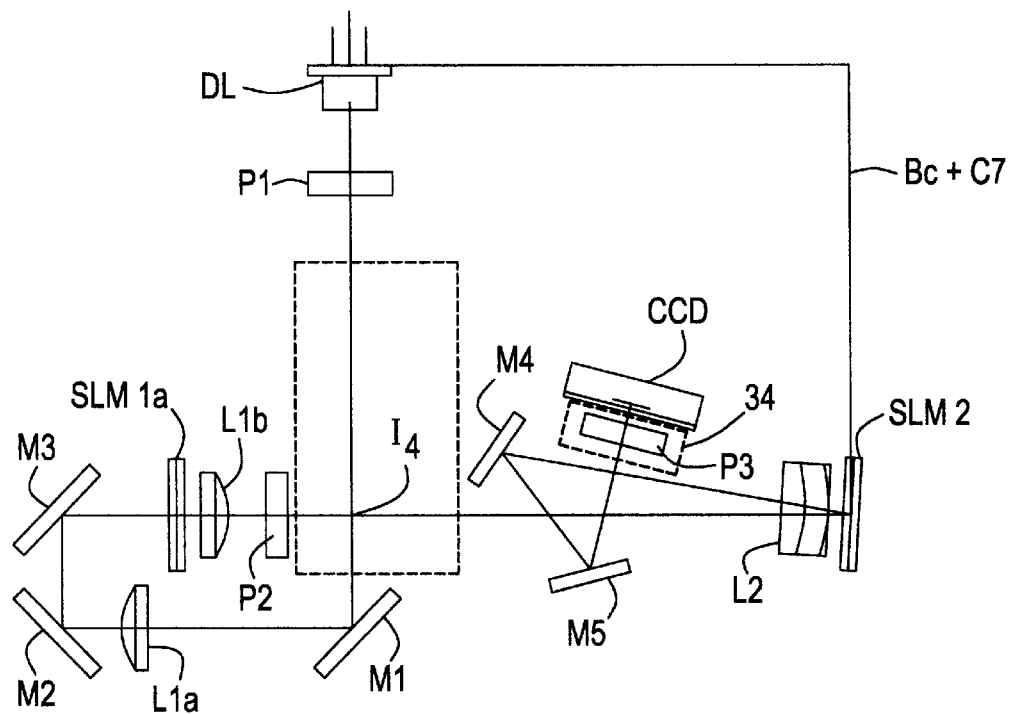
FIG. 18 is a simplified illustration of the Vander Lugt version of the correlator with transmissive scene and reflective SLMs.
Figure 19:
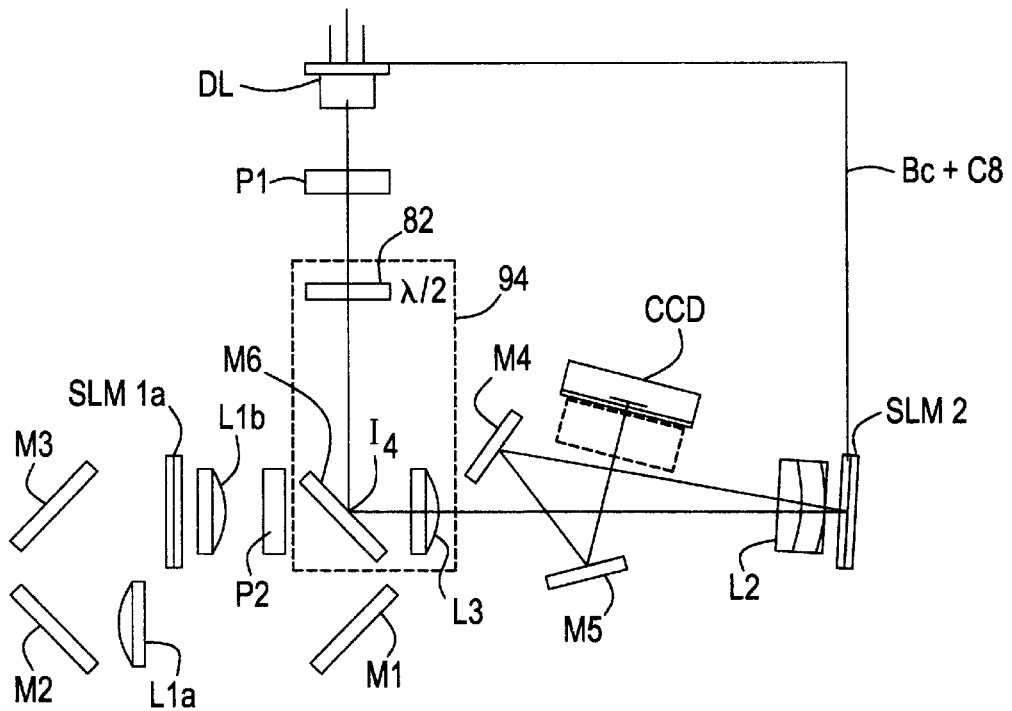
FIG. 19 is a simplified illustration, similar to FIG. 18, but showing the joint-transform version of the correlator with transmissive scene and reflective SLMs.

FIGS. 18 and 19 show the correlator of this invention with transmissive scene and reflective filter SLMs and again those components which perform the same function as the components in the prior correlators are given the same reference designations.

Thus in FIG. 18, the beam directed by diode laser DL through polarizer P1 intersects the Fourier transformed beam from polarizer P2 at point $I_4$. Mirror M1, lens L1a, mirrors M2 and M3, SLM1a, Fourier transform lens L1b and polarizer P2 function exactly the same as the similar components in FIG. 14. The Fourier transformed beam from filter P2 is directed through point $I_4$, through second Fourier transform lens L2 and focused onto SLM2. The Fourier transformed beam is reflected back through lens L2 where this beam is again Fourier transformed. This twice transformed beam is then directed to mirrors M4 and M5 (which corresponds to mirrors M2 and M3 in FIG. 5) which fold and direct the beam through polarizer P3 onto CCD at the correlation plane. Again, in this correlator, cover C7 has mount 34 to hold polarizer P3 in the beam path as in the prior correlator of FIG. 5.

In FIG. 19, cover C8 replaces cover C7, and includes a mount 94 for a mirror M6, halfwave plate 82 and a collimating lens L3. Removing cover C7 with polarizer P3 and replacing it with cover C8 converts the Vander Lugt correlator of FIG. 18 to a joint-transform correlator in the same manner as before. Both covers C7 and C8 are positioned on the base Bc in the same manner as in the prior correlators.

Again, the transmissive SLM of these figures is the same as the transmissive SLM in FIGS. 14 and 15 and the reflective SLM is the same as the reflective SLM in FIGS. 1–11. Thus with all other components being the same size as in the prior correlators, this module is within the same size range as the prior modules and mountable on a PC board as in FIGS. 12 and 13.

Figure 20:
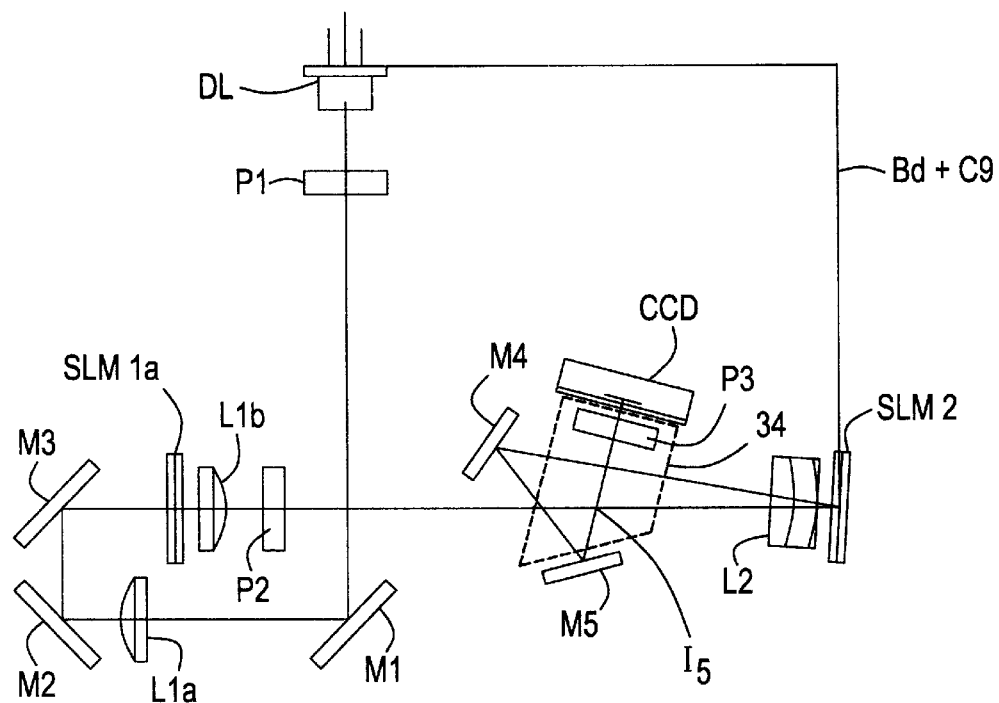
FIG. 20 is a simplified illustration, of the Vander Lugt version of the correlator with transmissive scene and reflective filter SLMs.
Figure 21:
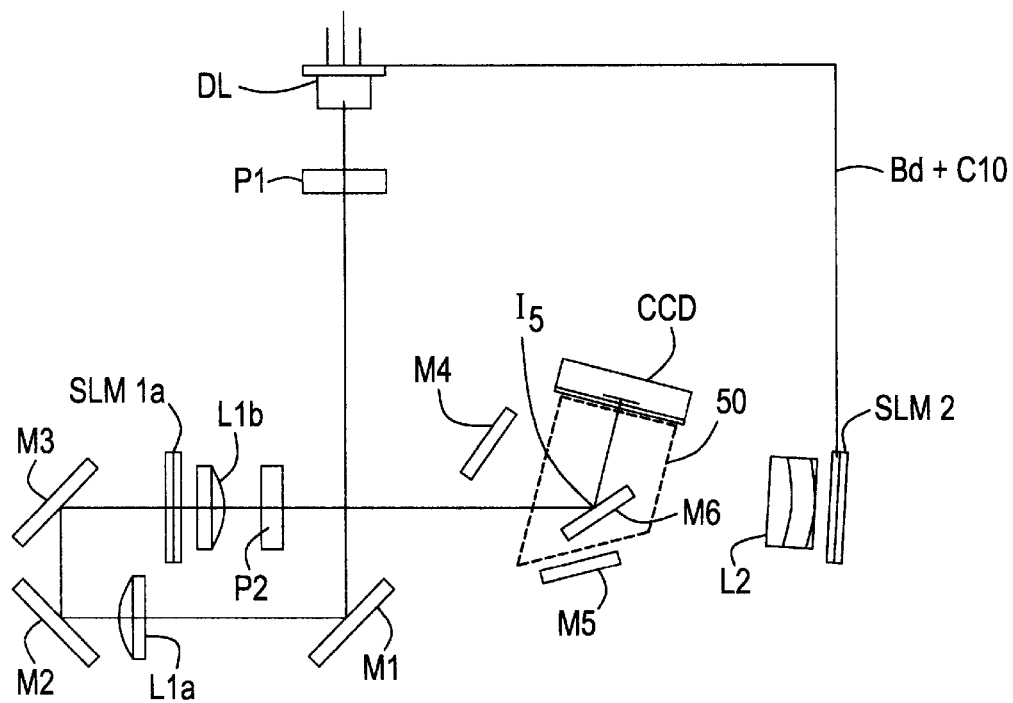
FIG. 21 is a simplified illustration, similar to FIG. 20 but showing the joint-transform version of the correlator with transmissive scene and reflective filter SLMs.

FIGS. 20 and 21 are alternative versions of the correlators using transmissive scene and reflective filter SLMs as shown in FIGS. 18 and 19. The optical path in FIG. 20 from the diode laser DL through the filter P2 is identical with that of FIG. 18 and the optical path from the filter P2 and ultimately onto the CCD is also the same as in FIG. 18. In this version, however, the intersection point $I_5$ is between the polarizing filter P2 and lens L2 to identify the point where mirror M6 is to be placed for the conversion to the joint-transform correlator as in FIG. 21 as in FIGS. 5 and 11. Mirror M6 cuts out lens L2 and SLM2 and directs the beam from filter P2 to CCD1 at the correlation plane. Again, removal of cover C9 along with filter P3 and replacing it with cover C10 places the mirror M6 in the beam path. Cover C10 has a mount 50 (similar to FIG. 11) to hold mirror M6 in the beam path between the filter P2 and lens L2. Covers C9 and C10 are mounted on base Bd in the same manner as the covers and base of the prior correlator.

Figure 22:
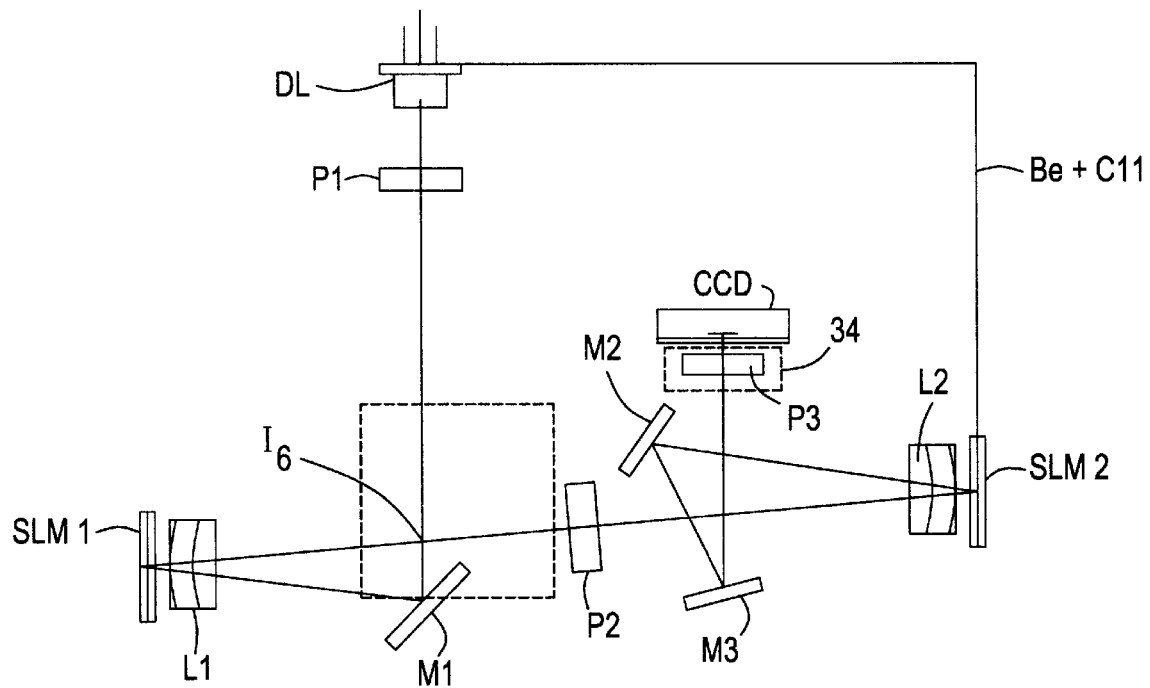
FIG. 22 is a simplified illustration of a Vander Lugt version of the correlator with reflective SLMs as in FIGS. 1–11 except that the intersection point of the light paths is changed.
Figure 23:
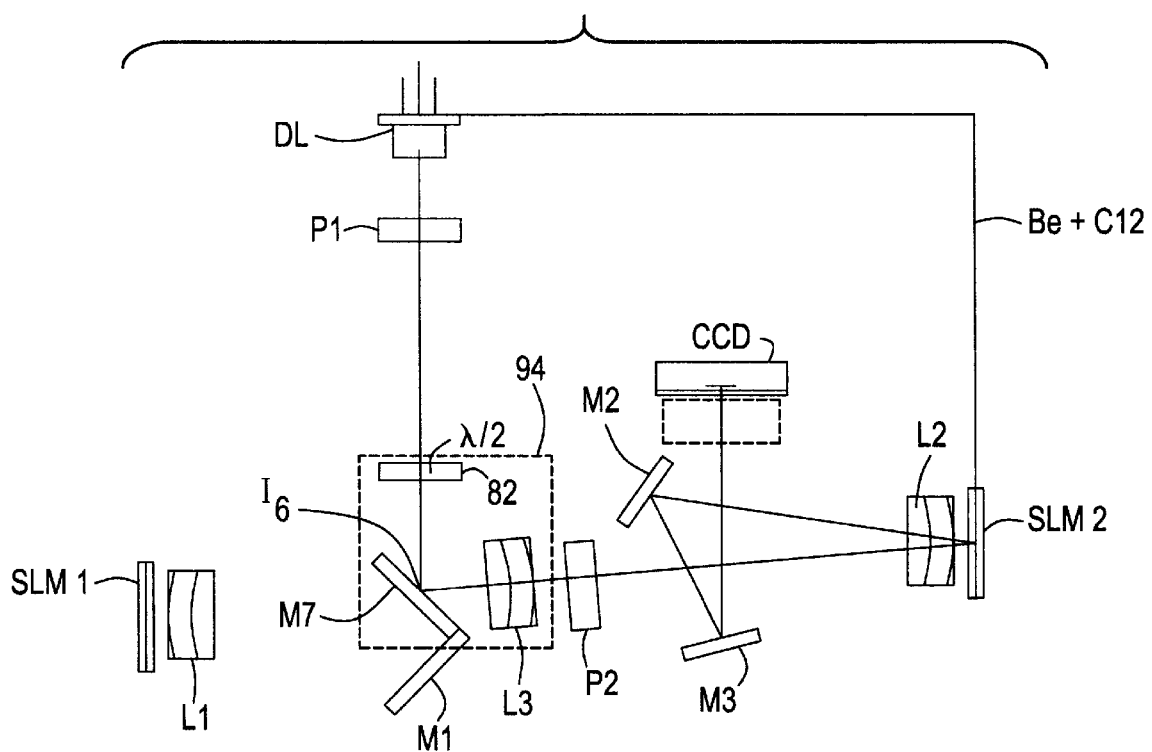
FIG. 23 is a simplified illustration, similar to FIG. 20, but showing the joint-transform version of the correlator with two reflective SLMs.

FIGS. 22 and 23 are alternative versions of the correlators using reflective scene and filter SLMs as shown in FIGS. 5 and 11. The optical path from the diode laser DL differs from that of FIG. 5 in that it intersects the optical path between SLM1 and SLM2 to define the point $I_6$ where mirror M7 is to be placed to convert the Vander Lugt correlator of FIG. 22 to the joint-transform correlator of FIG. 23. This version differs from FIGS. 5 and 11 in that the scene SLM no longer functions in the joint-transform correlator and the filter SLM performs the joint-transform correlation. Again, removing cover C11 along with filter P3 and replacing it with cover C12 along with mount 94 placing the halfwave ($\lambda/2$) plate 82 and lens L3 in the beam path to direct the beam toward SLM2. The covers C11 and C12 are mounted on the base Be in the same manner as the prior correlators.

Again, the SLMs and all other components of these latter figures being of the same size as in the prior correlators brings their respective modules within the same size range as the prior modules and mountable on a PC board as in the prior figures.

All of the previous correlators are converted from the Vander Lugt configuration to the joint-transform configuration by an exchange of module covers, however, as mentioned previously this conversion can also be accomplished by the use of one cover and moving, as by pivoting or sliding, the necessary components in and out of the optical path.

Figure 25:
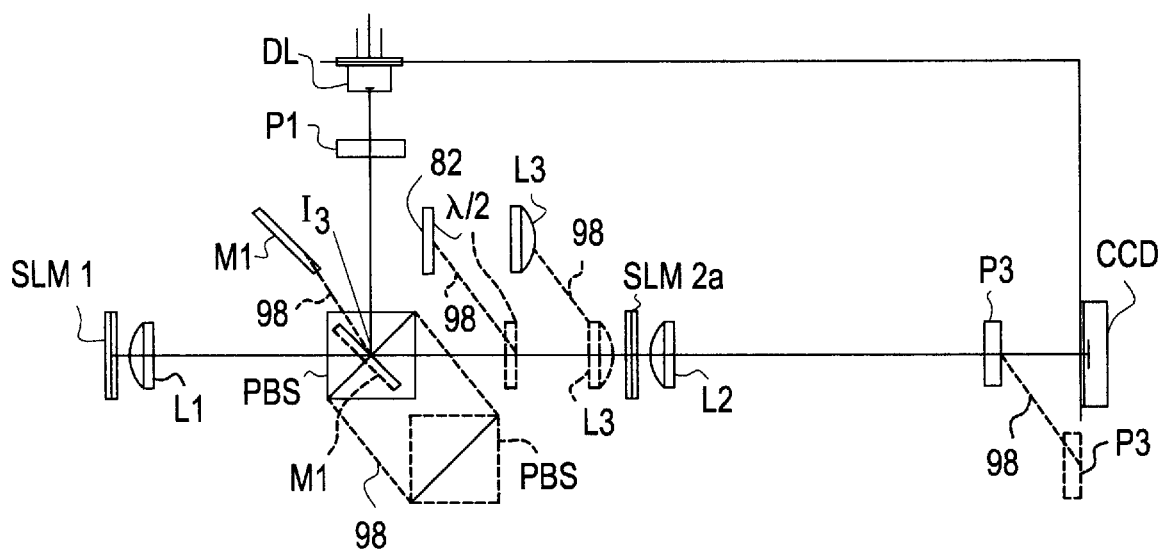
FIG. 25 is a simplified illustration, similar to FIGS. 16 and 17, showing the conversion from a Vander Lugt configuration to a joint-transform configuration by sliding selected optical components in and out of the optical path.
Figure 26:
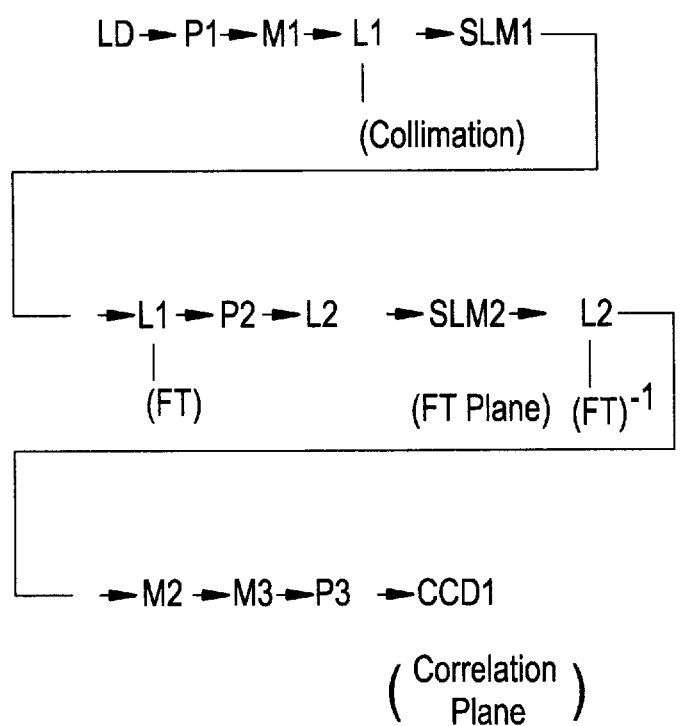
FIG. 26 is a flow chart of the operation steps of a Vander Lugt correlation, and FIG. 27A
Figure 27A:
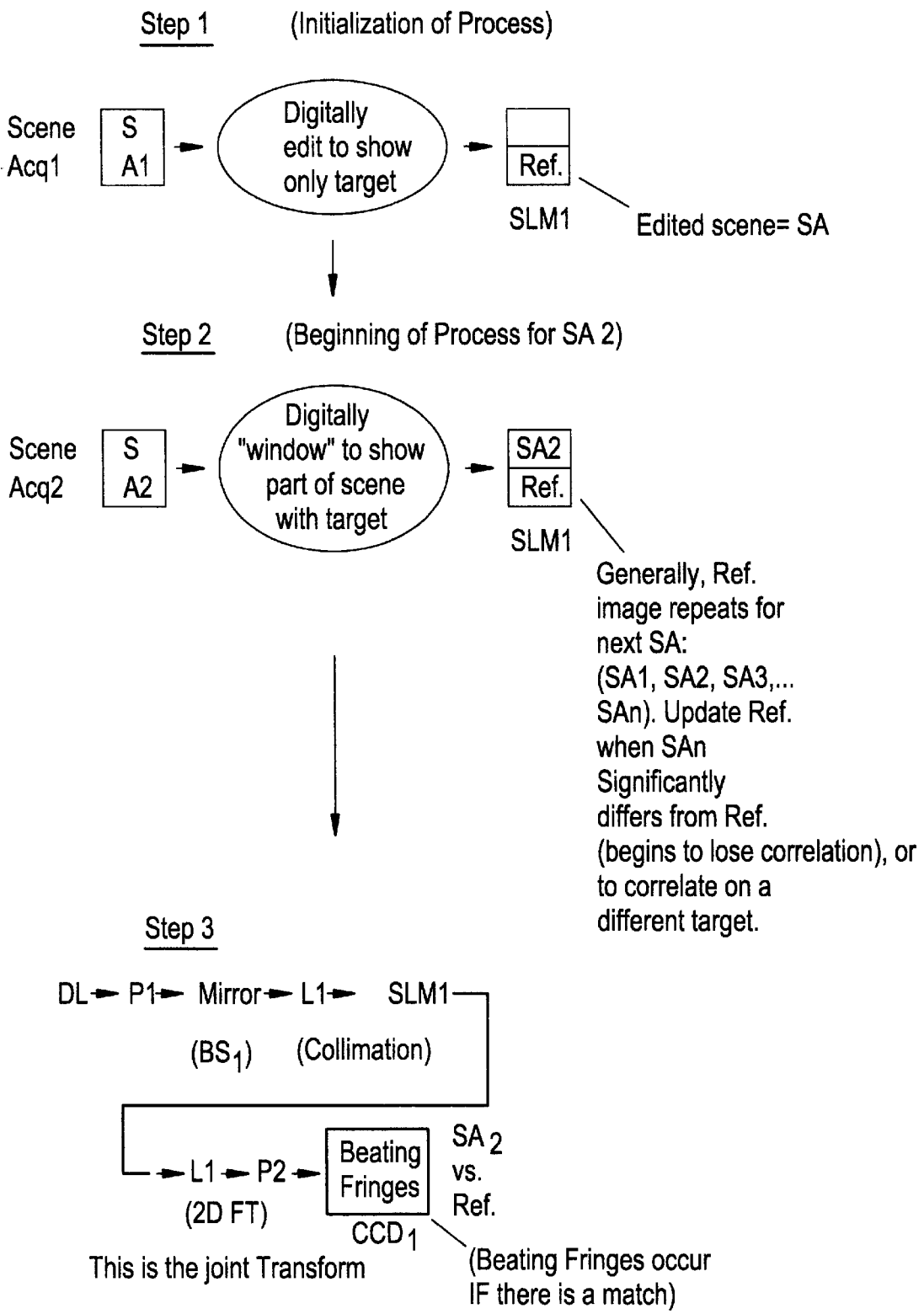
FIG. 27B is a flow chart of the process steps of a joint-transform correlation.
Figure 27B:
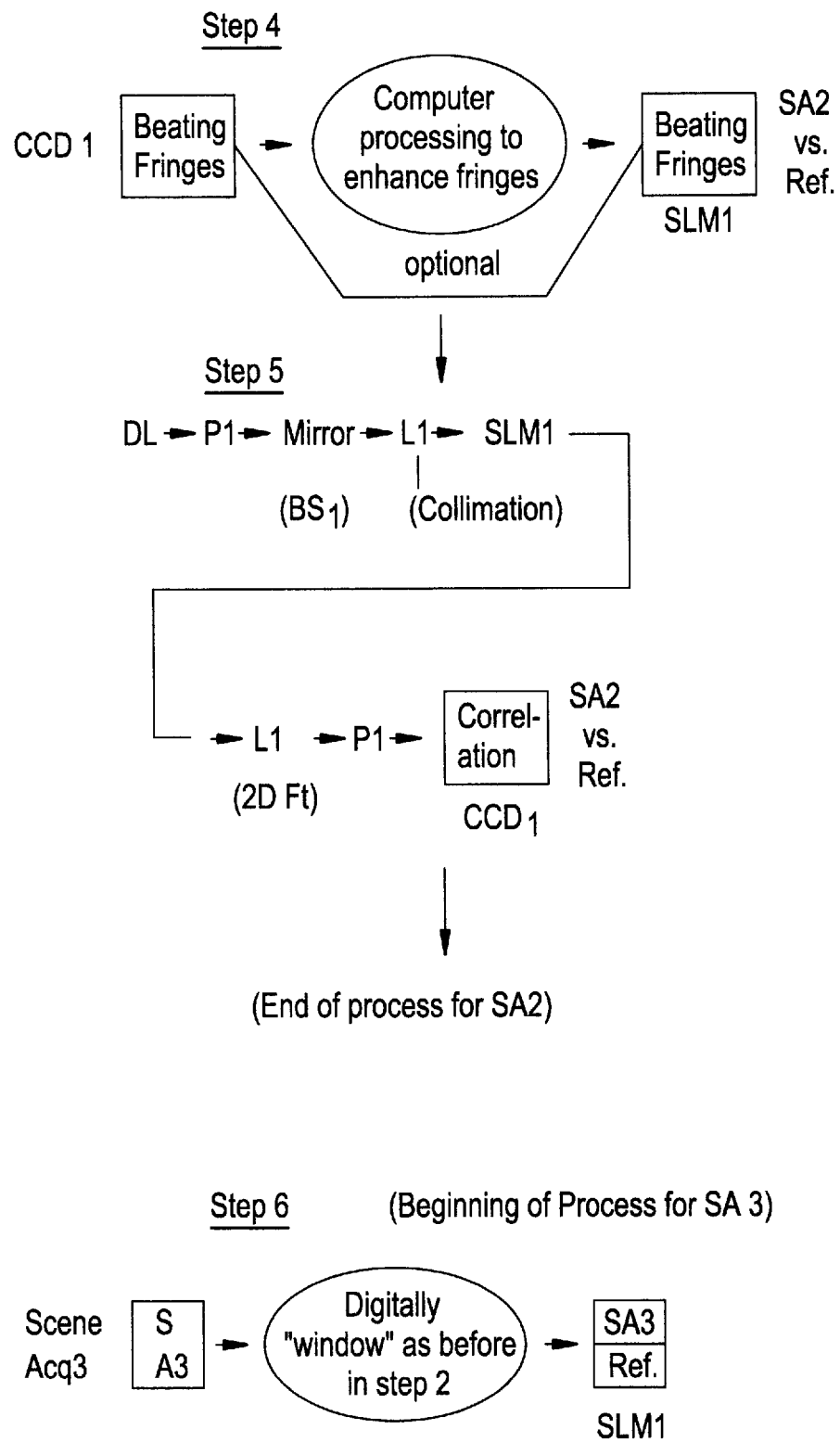

FIGS. 24 and 25 are examples of two of the prior correlators to show how this conversion can be done.

The correlator shown in FIG. 24 is a reflective scene and filter SLM correlator similar to FIGS. 5 and 11 and shows the conversion from the Vander Lugt configuration to the joint-transform configuration by swinging polarizer P3 and mirror M4 about pivot point 96 thus, moving polarizer P3 out of the optical path and mirror M4 into the optical path. This swing of about 40 degrees is represented by the dotted lines 98 radiating from the pivot point 96. Of course, to reconvert the joint-transform configuration back to the Vander Lugt configuration is simply a matter of pivoting polarizer P3 and mirror M4 back to their original positions. If packaging favors multiple pivots, each optic can be independently moved.

The correlator shown in FIG. 25 is a reflective scene and transmissive filter SLM correlator similar to the correlator of FIGS. 16 and 17 and shows that for the conversion from the Vander Lugt configuration to joint-transform configuration, mirror M1 is slid diagonally to point $I_3$ into the optical path while at the same time the polarizing beamsplitter PBS is slid diagonally in the same direction out of the optical path. This is represented schematically by the dotted line mirror M1 and the dotted line polarizer beamsplitter and the diagonal dotted lines 98. Similarly, the halfwave ($\lambda/2$) plate 82 and lens L3 are slid into the optical path between mirror M1 and SLM2a. Polarizer P3 is also slid diagonally out of the optical path as represented by the dotted line polarizer and by the dotted lines 96. To reconvert the joint-transform configuration is simply a matter of sliding mirror M1, halfwave plate 82, lens L3 and polarizer P3 back to their original positions. If packaging favors multiple slides, each optic can be independently moved.

I claim:

1. Apparatus for performing optical correlation, said apparatus convertable from Vander-Lugt correlation to joint transform correlation, said apparatus including a plurality of optical components interacting with a light beam to fold said light beam into a first path, a second path, a third path, and a fourth path, said apparatus comprising:

a first reflecting means, said light beam directed in the first path toward said first reflecting means which folds said beam and directs said light beam into said second path, a first SLM means coupled to receive a plurality of electronically addressed first SLM images, said first SLM means positioned to be illuminated by said light beam of said second path and to input said first SLM images into said light beam of said second path, and a first Fourier transform optical means for collimating said light beam, said first Fourier transform means positioned in said second path wherein said first SLM images inputted into said light beam are transformed by said first Fourier transform optic means and directed into said third path, a second Fourier transform optic means positioned in said third path and a second SLM means positioned in said third path, said second SLM means coupled to receive a plurality of second SLM images, wherein said second SLM means and said second Fourier transform optic means receive said first SLM images inputted into said light beam by said first SLM means and said second SLM means and said second Fourier transform optic means optically multiplying said first SLM images inputted into said light beam by said first SLM means by said second SLM images and direct the output light beam into said fourth path, a first polarizing filter means positioned in said fourth path, and a first detector means positioned in said fourth path wherein said first detector means detects correlation between said first SLM images and said second SLM images, an auxiliary mirror for converting to joint transform correlation positioned at a path intersection of said third path with a path selected from a group consisting of said first path, said second path, and said fourth path, said path intersection is in front of said second Fourier transform optic means and said second SLM means, such that said auxiliary mirror directs a target image and a reference image inputted into said light beam by said first SLM means to said first detector, wherein said detector detects joint transform correlation between said target image and said reference image.

2. The apparatus as claimed in claim 1 wherein said path selected from the group consisting of said first path, said second path, and said fourth path is said fourth path.

3. The apparatus as claimed in claim 1, wherein said path selected from the group consisting of said first path, said second path, and said fourth path is said first path.

4. The apparatus as claimed in claim 1 wherein said apparatus has a length and width less than the length and width of a printed circuit board so that the apparatus can be mounted onto the printed circuit board and connectable directly into a bus slot within a personal computer.

5. The apparatus as claimed in claim 4 wherein said path selected from the group consisting of said first path, said second path, and said fourth path is said fourth path.

6. The apparatus as claimed in claim 4 wherein said path selected from the group consisting of said first path, said second path, and said fourth path is said first path.

7. The apparatus as claimed in claim 4 wherein said first SLM means is reflective and said second SLM means is transmissive.

8. The apparatus as claimed in claim 4 wherein said first SLM means is transmissive and said second SLM means is reflective.

9. The apparatus as claimed in claim 1 wherein said light beam is pulsed.

10. The apparatus as claimed in claim 1 wherein said light beam is continuous.

11. A method of optical correlation that is capable of being convertable from Vander-Lugt correlation to joint transformation correlation comprising the steps of:

providing a module having a light beam, said light beam folded in multiple light paths, providing a first electronically addressed SLM for displaying a plurality of first images, providing a second electronically addressed SLM for displaying a plurality of second images, displaying said first images on said first SLM, optically coupling said first SLM to said second SLM so that said first SLM directs said first images onto said second SLM, providing a first Fourier transform optic means so that said first images directed onto said second SLM from said first SLM are Fourier transformed, displaying said second images on said second SLM, such that said displayed second images interact with said Fourier transformed first images directed onto said second SLM wherein said second SLM provides an output beam, providing a second Fourier transform optic means so that said output beam provided by the second SLM is Fourier transformed and directed toward a polarizer means and a detector means wherein said detector means detects a Vander Lugt correlation between said first images and said second images, placing an auxiliary mirror in said light beam in front of said first SLM so that said first SLM is optically uncoupled from said second SLM, displaying a plurality of third images on said second SLM, said third images comprised of a target image and a reference image, wherein said auxiliary mirror directs said third images from said second SLM to said detector means wherein said detector means detects a joint transform correlation between said target image and said reference image of said third images.

12. A method of optical correlation that is capable of being convertable from Vander-Lugt correlation to joint transformation correlation comprising the steps of:

providing a module having a light beam, said light beam folded in multiple light paths, providing a first electronically addressed SLM for displaying a plurality of first images, providing a second electronically addressed SLM for displaying a plurality of second images, displaying said first images on said first SLM, optically coupling said first SLM to said second SLM so that said first SLM directs said first images onto said second SLM, providing a first Fourier transform optic means so that said first images directed onto said second SLM from said first SLM are Fourier transformed, displaying said second images on said second SLM, such that said displayed second images interact with said Fourier transformed first images directed onto said second SLM wherein said second SLM provides an output beam, providing a second Fourier transform optic means so that said output beam provided by the second SLM is Fourier transformed and directed toward a polarizer means and a detector means wherein said detector means detects a Vander Lugt correlation between said first images and said second images placing an auxiliary mirror in said light beam in front of said second SLM so that said first SLM is optically uncoupled from said second SLM, displaying a plurality of third images on said first SLM, said third images comprised of a target image and a reference image, wherein said auxiliary mirror directs said third images from said first SLM to said detector means wherein said detector means detects a joint transform correlation between said target image and said reference image of said third images.

13. The method as claimed in claim 12 including the further step of placing said module on a standard printed circuit board capable of being plugged inside, and totally reside within, a personal computer.

\* \* \* \* \*